United States Patent [19]

Ohman

[11] Patent Number: 5,023,444
[45] Date of Patent: Jun. 11, 1991

[54] MACHINE PROXIMITY SENSOR

[75] Inventor: Carl Ohman, Danbury, Conn.

[73] Assignee: Aktiebolaget Electrolux, Stockhom, Sweden

[21] Appl. No.: 458,318

[22] Filed: Dec. 28, 1989

[51] Int. Cl.⁵ .............................................. G01V 9/04
[52] U.S. Cl. .................................... 250/221; 180/274
[58] Field of Search ................ 250/221, 222.1, 338.1, 250/342; 180/274, 275, 277, 278, 279; 293/4; 340/436, 437, 555, 556, 565, 567

[56] References Cited

U.S. PATENT DOCUMENTS

| | | |
|---|---|---|
| 3,730,633 | 5/1973 | Kennedy . |
| 4,021,119 | 5/1977 | Stauffer . |
| 4,247,767 | 1/1981 | O'Brien et al. . |
| 4,363,376 | 12/1982 | Sjoberg et al. ........................ 180/275 |
| 4,446,602 | 5/1984 | Marx et al. . |
| 4,563,578 | 1/1986 | Nagai . |
| 4,564,085 | 1/1986 | Melocik . |
| 4,590,410 | 5/1986 | Jonsson . |
| 4,730,690 | 3/1988 | McNutt et al. ...................... 180/274 |
| 4,802,548 | 2/1989 | Kausch ................................ 180/274 |
| 4,811,004 | 3/1989 | Person et al. . |
| 4,855,717 | 8/1989 | Hafner ................................. 340/556 |
| 4,880,969 | 11/1989 | Lawrie ................................. 250/221 |

Primary Examiner—David C. Nelms
Attorney, Agent, or Firm—Pearne, Gordon, McCoy & Granger

[57] ABSTRACT

A proximity sensor is provided for a machine which has a perimeter guard around the periphery of the frame of the machine. The machine has at least a moving part moved by the drive and with a control circuit to control the drive. The perimeter guard includes a radiation transmitter to project a radiation beam at least part of which extends outside the periphery. The perimeter guard further has movable mirrors and a movable bumper which, when moved, inhibit a radiation receiver from receiving the radiation beam. In this case, an output indication is generated to control the drive and stop the machine part. The foregoing abstract is merely a resume of one general application, is not a complete discussion of all principles of operation or applications, and is not to be construed as a limitation on the scope of the claimed subject matter.

13 Claims, 3 Drawing Sheets

MACHINE PROXIMITY SENSOR

BACKGROUND OF THE INVENTION

U.S. Pat. No. 4,446,602 discloses a light beam fence with a single beam reflected by mirrors to detect the presence of a person within a zone and to stop the operation of the machine in the zone. U.S. Pat. Nos. 3,730,633 and 4,021,119 disclose an optical system for measuring the amount of intrusion of an object into a light beam split into two beams directed by mirrors. U.S. Pat. No. 4,811,004 discloses an optical position sensing system for computer displays. The system uses light beams scanned by moving mirrors. U.S. Pat. No. 4,564,085 discloses a light beam detecting system with a mirror which may swing out of the way to allow an alternate light path to be used.

SUMMARY OF THE INVENTION

The above-mentioned prior art references are not well suited to a perimeter guard, especially to a perimeter guard on a movable machine, because the mirrors in the first-mentioned reference might be bumped by an obstruction and the remaining references do not show something which would be able to detect an obstruction in any position around the periphery of the machine.

The problem to be solved, therefore, is how to construct a proximity sensor for a machine which has at least one moving part and has a frame with a periphery, and to provide a perimeter guard for the machine.

This problem is solved by a proximity sensor for a machine having at least a moving part and having a frame with a periphery, a perimeter guard including a radiation transmitter to project a radiation beam at least part of which extends outside said periphery, a radiation receiver mounted to receive said radiation beam for producing an output indication when it is not receiving the radiation beam, drive means to drive the moving part, control means for said drive means responsive to said output indication, said perimeter guard further including movable means capable of being moved to inhibit said radiation receiver from receiving said radiation beam, and said radiation transmitter normally projecting a radiation beam at least part of which extends outside said periphery, whereby movement of the movable means relative to the machine inhibits said radiation beam from being received at said receiver and thus generates said output indication to arrest said machine movable part.

The problem is further solved by a proximity sensor for a movable surface treatment machine having a frame with a periphery, a perimeter guard with a radiation transmitter to project a radiation beam, a radiation receiver mounted to receive said radiation beam for producing an output indication when it is not receiving the radiation beam, drive means to drive said surface treatment machine, control means for said drive means responsive to said output indication, said perimeter guard further including movable means acting on said radiation beam and capable of being moved by an obstruction to inhibit said radiation receiver from receiving said radiation beam, and said radiation transmitter normally projecting a radiation beam at least part of which extends outside said periphery, whereby movement of the movable means by an obstruction inhibits said radiation beam from being received at said receiver and thus generates said output indication to control said drive means.

Accordingly, an object of the invention is to provide a proximity sensor for a machine which constitutes a perimeter guard of the machine.

Another object of the invention is to provide a proximity sensor for a machine utilizing a radiation beam as a perimeter guard.

Other objects and a fuller understanding of the invention may be had by referring to the following description and claims, taken in conjunction with the accompanying drawing.

DESCRIPTION OF THE PREFERRED EMBODIMENT

Figure 1:
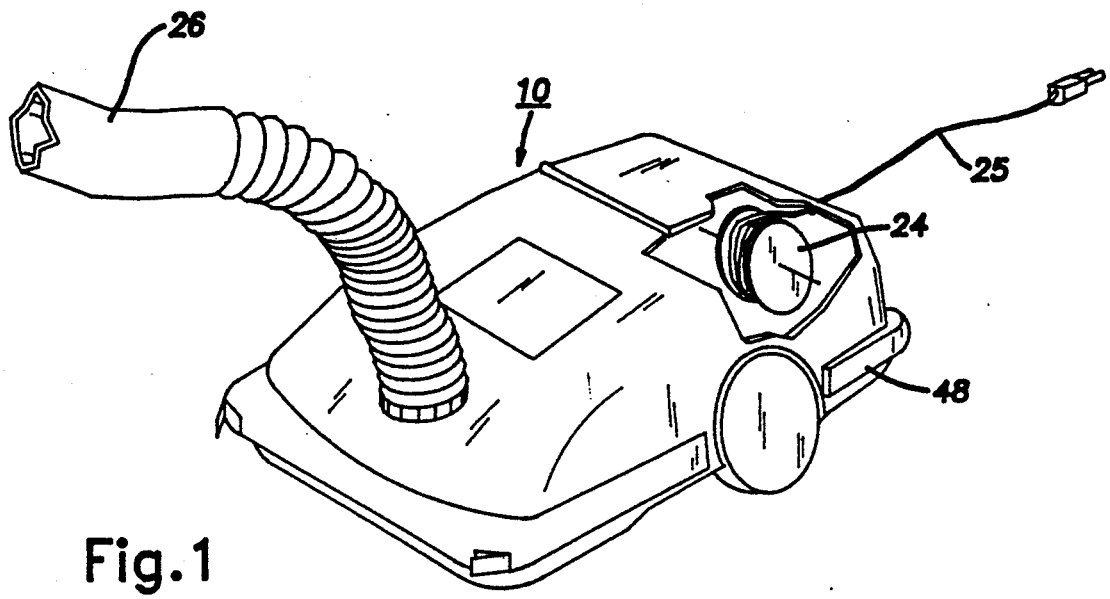
FIG. 1 is a perspective view of a machine embodying the proximity sensor of the invention.
Figure 2:
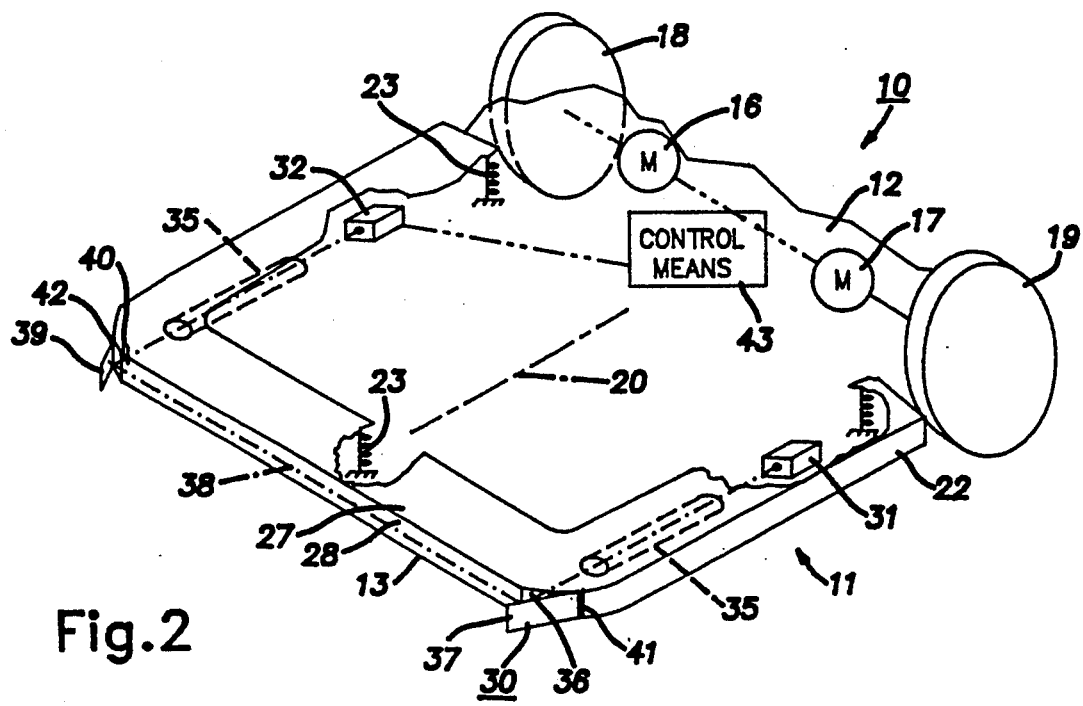
FIG. 2 is a perspective view of the machine, diagrammatically showing the parts therein.

FIGS. 1 and 2 show a machine 10 with which the proximity sensor 11 may be used. The machine 10 may be a stationary machine, for example, a punch press, wherein there is a moving part which is dangerous to an operator or observers. The proximity sensor includes a perimeter guard around the periphery of the machine so that should an operator or observer violate the perimeter guard, a signal would be given to stop the moving part. FIGS. 1 and 2 show the machine not as being a stationary device, but as being movable, and in this case it is shown as being a movable surface treatment machine having a frame 12 with a periphery 13 of this frame. Drive means is provided, including drive motors 16 and 17 for drive wheels 18 and 19, respectively. When both wheels are driven at the same speed, the machine 10 will move forwardly or backwardly parallel to a longitudinal fore and aft axis 20.

A movable bumper 22 is provided on the machine 10. This bumper is movable by being supported from the frame 12 by springs 23, the upper end of which is connected to the bumper and the lower end of which is connected to the frame 12. In this way, the bumper may move longitudinally as well as transversely relative to the frame 12. The bumper 22 is L-shaped in cross section with a horizontal plate 27 and a vertical plate 28. Also, the bumper is C-shaped in plan view.

The surface treatment machine of FIGS. 1 and 2 is shown as a robot vacuum cleaner with a self-winding reel 24 for a power cord 25, which may be plugged into a convenience outlet for powering the machine. A vacuum hose 26 is provided for floor or off-the-floor cleaning functions when the vacuum cleaner is used in the manual mode rather than the robot mode.

The proximity sensor includes a perimeter guard 30, which in turn includes a radiation transmitter 31 and a radiation receiver 32. The transmitter and receiver are mounted on the frame 12 to the rear of the bumper 22.

The radiation transmitter emits a radiation beam, e.g., infrared (focused) light from an LED (Light Emitting Diode) or possibly a laser, which in normal practice is designed to impinge on the radiation receiver 32. This radiation beam from the transmitter 31 passes through an aperture 35 in the bumper 22 and through a window 36 in the front left corner of the bumper, the window being transparent to the frequency of the radiation. The beam 38 is reflected from a movable mirror 37, and has at least part thereof extending outside the periphery 13 of the machine frame. In this case, the beam extends in front of the front of the bumper 22 and substantially parallel thereto, to be received and reflected by a second mirror 39 at the right front corner of the machine. It is reflected from this mirror through a transparent window 40 in the front corner of the bumper and through another bumper aperture 35 to the radiation receiver 32. The mirrors 37 and 39 are movable by being mounted on hinges 41 and 42, respectively, and with springs (not shown) to urge them outwardly away from the bumper and with stops (not shown) to hold the two mirrors 37 and 39 at plus 45 and minus 45-degree angles relative to the axis 20, respectively. By these two 45-degree angles, the radiation beam from the radiation transmitter 31 normally is received at the radiation receiver 32. When it is not so received, then an output indication is generated which is applied to a control means 43, which in turn controls the drive means 16 and 17.

The perimeter guard includes movable means and these movable means includes the movable mirrors 37 and 39, as well as the movable bumper 22. The movable mirrors are optical elements to act on the beam.

Figure 3:
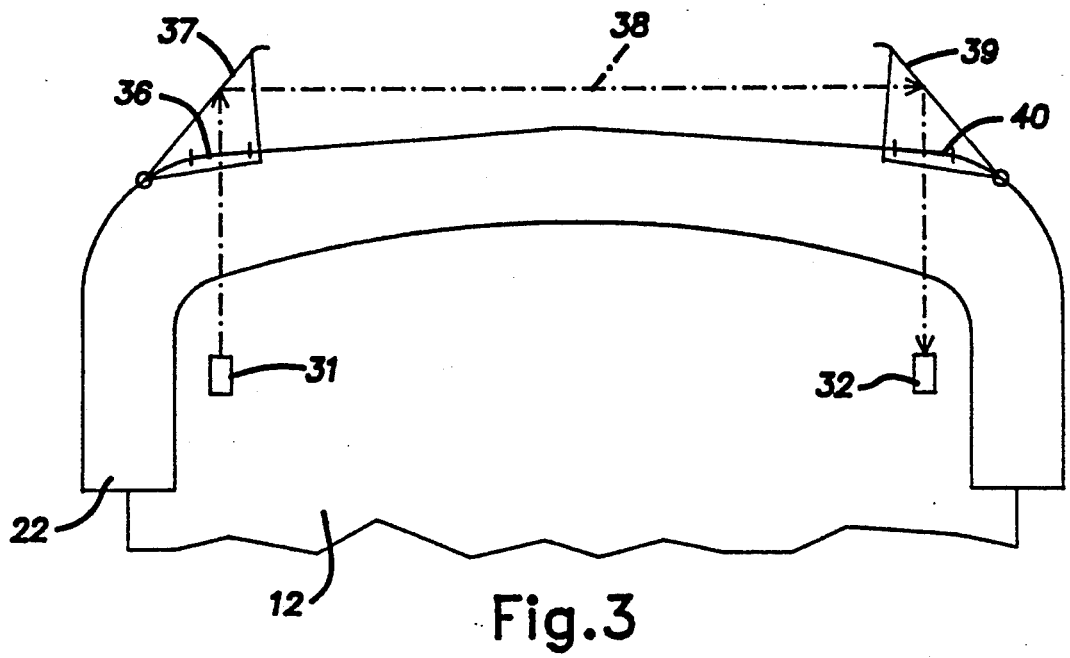
FIG. 3 is a diagrammatic plan view showing the path of the radiation beam.

FIG. 3 illustrates diagrammatically the normal condition of the radiation beam 38 emanating from the radiation transmitter 31 being reflected by the mirrors 37 and 39 and being received at the radiation receiver 32.

Figure 4:
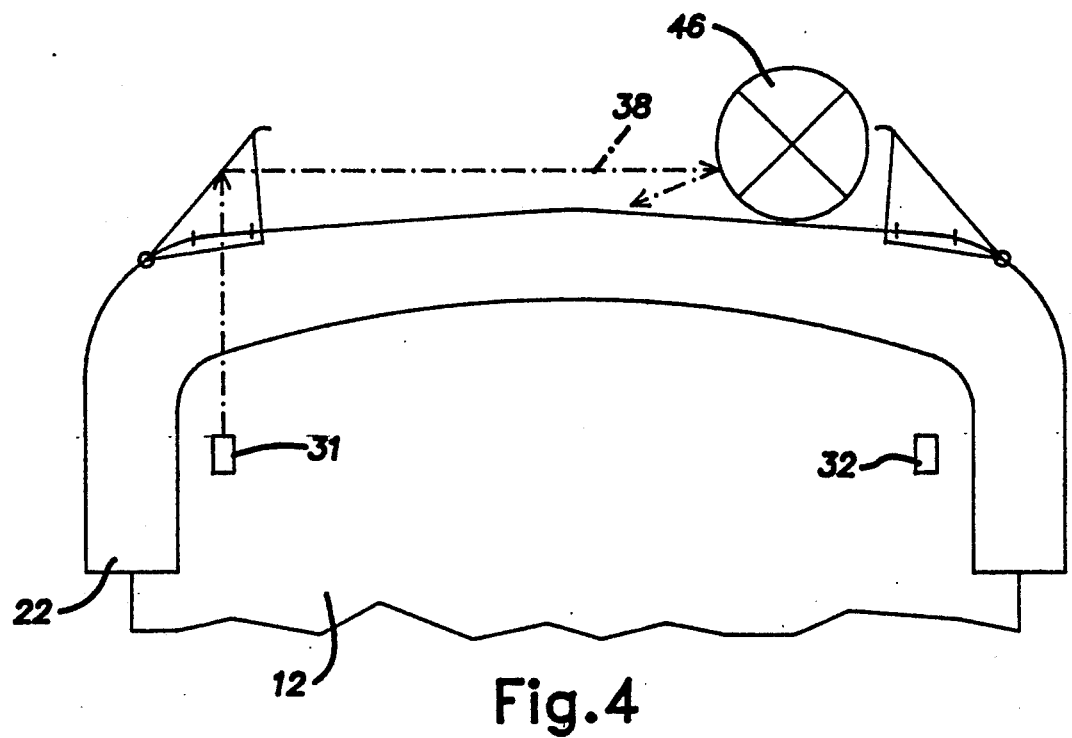
FIGS. 4-6 show diagrammatically different ways of obstructing the beam.

FIG. 4 illustrates the perimeter guard when an obstruction 46 intercepts the beam 38. It does this forward of the bumper 22 at that portion wherein the beam extends outside the periphery 13 of the machine. With the obstruction 46 being present, the beam no longer reaches the radiation receiver 32; hence, an output indication is generated so that the control means 43 stops the movable machine part, in this case, the wheels 18 and 19.

Figure 5:
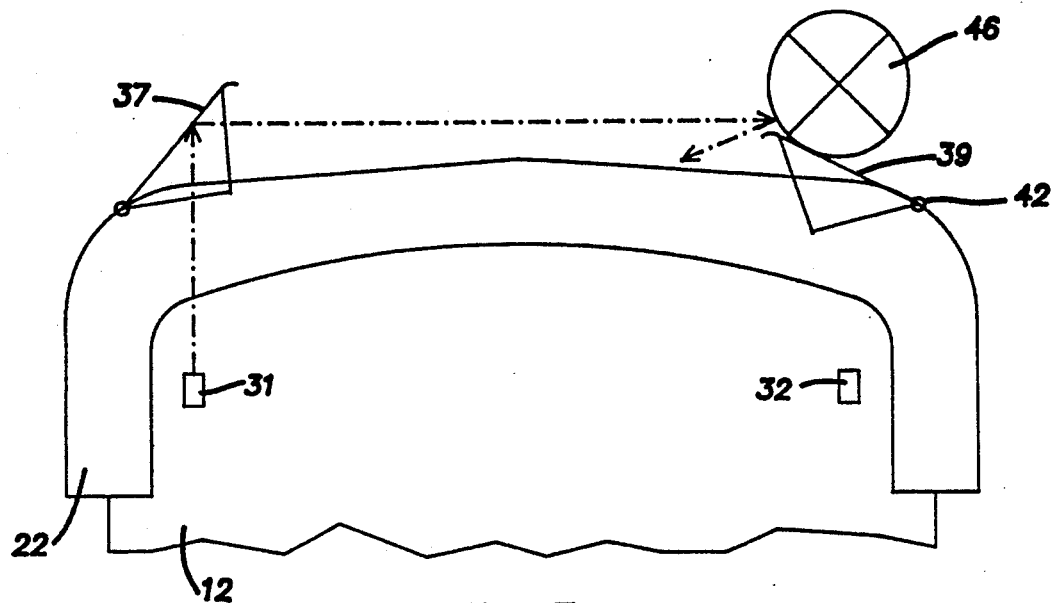

FIG. 5 illustrates a second condition wherein the obstruction 46, instead of breaking the beam, strikes the mirror 39 and moves the mirror 39 about its hinge 42. The mirror is no longer in a position to reflect the beam to the radiation receiver 32; hence, an output indication is generated and the wheels are stopped.

Figure 6:
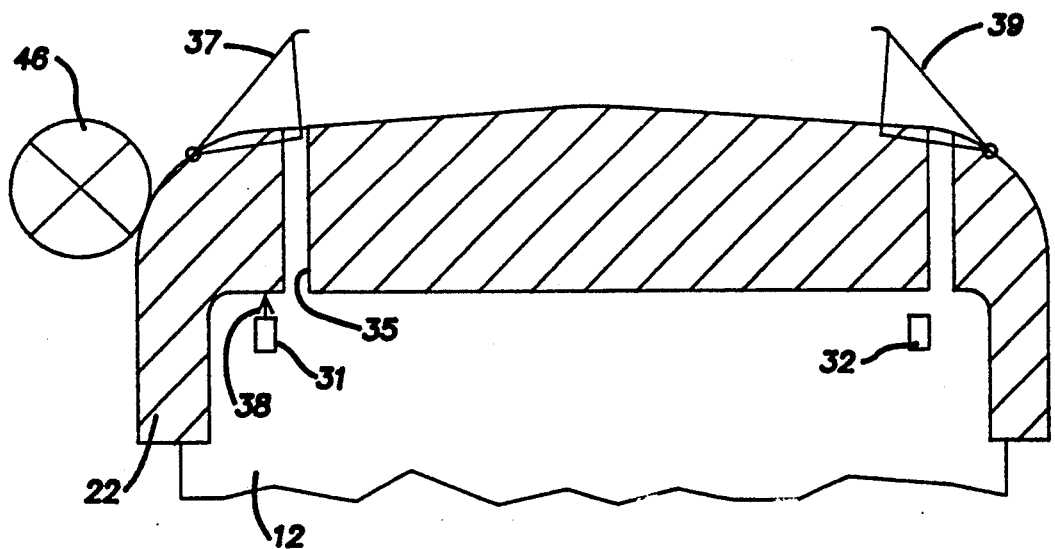

FIG. 6 illustrates a third condition wherein an obstruction 46 has struck a glancing blow on the corner of the bumper 22 outboard of the mirror 37. Because the bumper is mounted for lateral as well as longitudinal movement, the bumper 22 in this case moves laterally, so that the aperture 35 is no longer aligned with the radiation beam 38. Thus, a part of the bumper blocks the beam so it is not received at the radiation receiver 32 and the output indication is therefore generated. These three conditions of controlling the drive means 16 and 17 establish the perimeter guard as emitting a signal when the forward movement of the machine 10 encounters an obstruction. The machine 10 may have a rear bumper 48, shown in FIG. 1, with a similar proximity sensor to control the machine during reverse movements thereof.

The mirrors 37 and 39 reflect the radiation beam around a corner of the frame 12. The apertures 35 are substantially parallel to the axis 20 to pass the radiation beam from the transmitter 31 to the receiver 32.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts, and in the details of the circuit and the combination and arrangement of circuit elements may be restored to without departing from the spirit and scope of the invention as hereinafter claimed.

What is claimed is:

1. A proximity sensor for a machine having at least a moving part and having a frame with a periphery;
   a perimeter guard including a radiation transmitter to project a radiation beam at least part of which extends outside said periphery, said transmitter being protectively mounted within and away from said periphery;
   a radiation receiver mounted to receive said radiation beam for producing an output indication when it is not receiving the radiation beam, said receiver being protectively mounted within and away from said periphery;
   drive means to drive the moving part;
   control means for said drive means responsive to said output indication;
   said perimeter guard further including an optical system acting on said radiation beam capable of being moved to inhibit said radiation receiver from receiving said radiation beam; and
   said radiation transmitter normally projecting a radiation beam at least part of which extends outside said periphery, whereby movement of said optical system relative to the machine inhibits said radiation beam from being received at said receiver and thus generates said output indication to arrest said machine movable part.

2. A proximity sensor as set forth in claim 1, wherein said optical system includes a first movable mirror reflecting said radiation beam around a corner of said frame.

3. A proximity sensor as set forth in claim 2, including spring means urging said mirror outwardly of said frame; and
   stop means to normally position said mirror at a 45-degree angle relative to a fore and aft longitudinal axis of said frame.

4. A proximity sensor as set forth in claim 2, wherein said optical system includes a second mirror pivotally mounted relative to said frame at a second corner of said frame;
   spring means urging said second mirror outwardly in front of said frame; and
   stop means to normally position said second mirror at a minus 45-degree angle relative to said fore and aft longitudinal axis.

5. A proximity sensor as set forth in claim 4, including first and second windows on said machine transparent to said radiation beam with said first window mounted between said radiation transmitter and said first mirror, and said second window mounted between said second mirror and receiver.

6. A proximity sensor for a movable surface treatment machine having a frame with a periphery;
   a perimeter guard with a radiation transmitter to project a radiation beam, said transmitter being protectively mounted within and away from said periphery;

a radiation receiver mounted to receive said radiation beam for producing an output indication when it is not receiving the radiation beam, said receiver being protectively mounted within and away from said periphery;

drive means to drive said surface treatment machine;

control means for said drive means responsive to said output indication;

said perimeter guard further including an optical system acting on said radiation beam and capable of being moved by an obstruction to inhibit said radiation receiver from receiving said radiation beam; and said radiation transmitter normally projecting a radiation beam at least part of which extends outside said periphery, whereby movement of the optical system by an obstruction inhibits said radiation beam from being received at said receiver and thus generates said output indication to control said drive means.

7. A proximity sensor as set forth in claim 6, wherein said surface treatment machine is a robot vacuum cleaner.

8. A proximity sensor as set forth in claim 6, including a bumper on the front of said frame; and said being mounted on said bumper.

9. A proximity sensor as set forth in claim 8, including means to mount said bumper relative to said frame for movement along a longitudinal axis of the frame and for transverse movement relative to said axis.

10. A proximity sensor as set forth in claim 9, wherein said optical system includes a first mirror, and a first aperture in said bumper for transmission of a radiation beam substantially parallel to said axis, said first aperture being located between said radiation transmitter and said first mirror.

11. A proximity sensor as set forth in claim 8, including means to mount said bumper relative to said frame for movement transversely to a longitudinal axis of said frame;

beam blocking means on said bumper laterally of the path of said radiation beam whereby movement of the surface treatment machine may cause the machine to strike an obstruction, moving the bumper laterally and therefore inhibiting said radiation beam from being received at said receiver to control said drive means.

12. A proximity sensor as set forth in claim 11, including means to direct at least part of said radiation beam generally parallel to and in front of said bumper whereby forward movement of the machine may cause an obstruction to break the radiation beam to control said drive means.

13. A proximity sensor for a movable surface treatment machine having a frame with a periphery, a perimeter guard with a radiation transmitter to project a radiation beam, a radiation receiver to receive said radiation beam for producing an output indication when it is not receiving the radiation beam, drive means to drive said surface treatment machine, control means for said drive means responsive to said output indication, said perimeter guard further including movable means acting on said radiation beam and capable of being moved by an obstruction to inhibit said radiation receiver from receiving said radiation beam, said radiation transmitter normally projecting a radiation beam at least part of which extends outside of said periphery, whereby movement of said movable means by an obstruction inhibits said radiation beam from being received at said receiver and thus generating said output indication to control said drive means, a bumper in front of said frame, said movable means being mounted on said bumper, means to mount said bumper relative to said frame for movement along a longitudinal axis of the frame, and for transverse movement relative to said axis, said movable means comprising a first mirror, and a first aperture in said bumper for transmission of a radiation beam substantially parallel to said axis, said first aperture being located between said radiation transmitter and said first mirror, said movable means also including a second mirror, and including a second aperture in said bumper for transmission of said radiation beam substantially parallel to said axis, said second aperture being located between said second mirror and said receiver, whereby forward movement of said surface treatment machine may cause the machine to strike an obstruction, moving said bumper and causing at least one of said apertures to move laterally of said axis and therefore inhibit said radiation beam from being received at said receiver to control said driver means.

* * * * *